UNITED STATES PATENT OFFICE 2,638,775

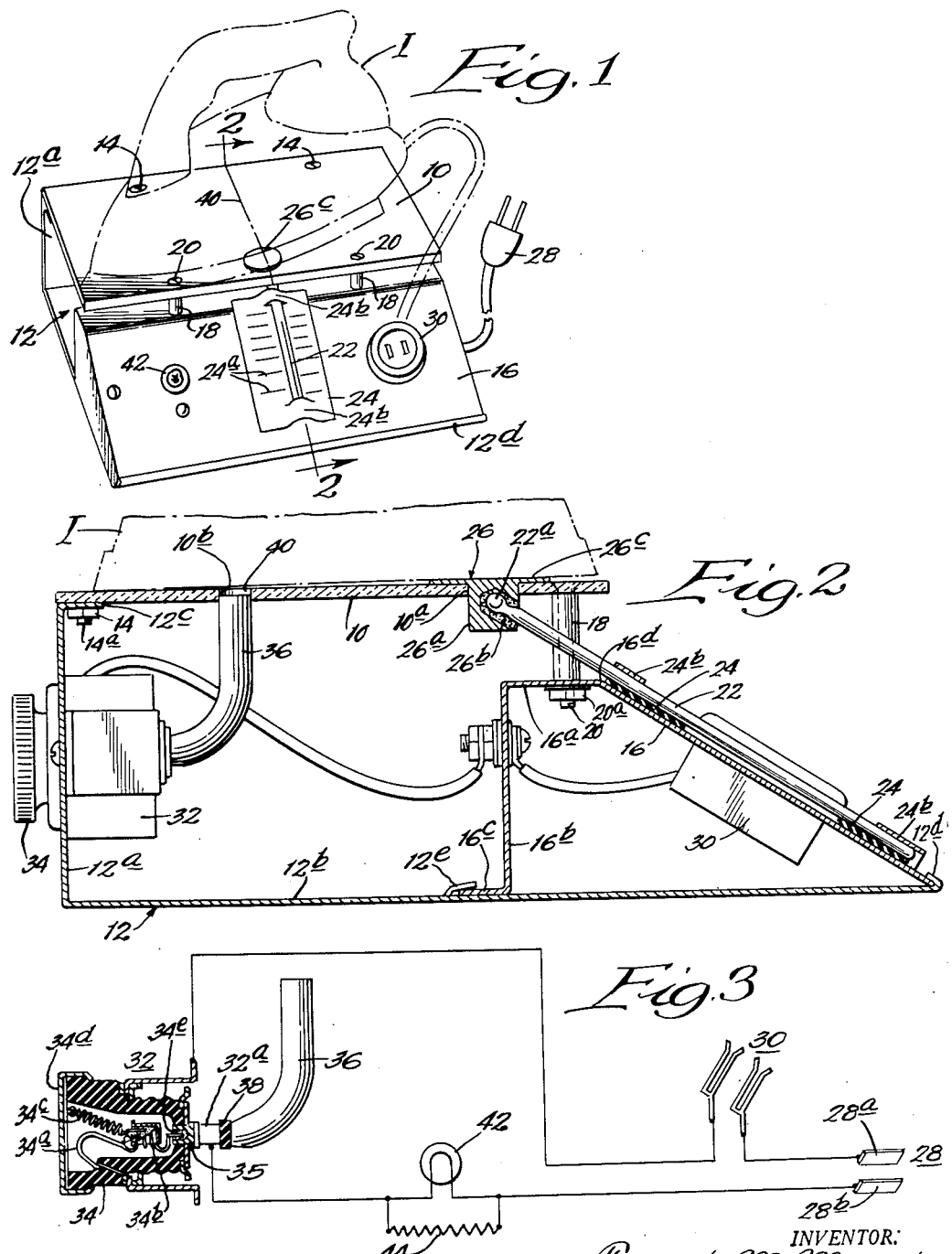

TESTING DEVICE FOR IRONS

Frank M. Murphy, Chicago, Ill.

Application May 9, 1950, Serial No. 160,874

5 Claims. (Cl. 73—1)

My invention relates to an improved device to test an electric iron or similar device and display in an easily observed manner the operating condition thereof.

Domestic electric irons must maintain surface temperature with predetermined limits while ironing. This demands that the heating element of the iron be free from short circuits and open circuits and that the temperature selecting devices be in good operating condition. Since these facts cannot be reliably determined by observation of the iron or by simple temperature or electrical measurements, it is necessary to provide a device that indicates in simple manner the state of the iron in these respects, thereby indicating to repairmen the repairs necessary and displaying to purchasers the fact that the iron is operating effectively.

In accordance with the present invention an iron testing device is provided which simulates closely the thermal conditions to which the iron is exposed and indicates on an inexpensive straight thermometer the effective temperature of the face of the iron. Moreover, the device of the present invention is provided with a fuse mechanism that partakes of the temperature of the iron and interrupts the energizing circuit if that temperature becomes excessive, thereby avoiding further damage to the iron.

It is therefore a general object of the present invention to provide an improved testing device for an electric iron.

Another object of the present invention is to provide an improved electric iron testing device which protects the iron against overheating.

Further it is an object of the present invention to provide an improved electric iron testing device wherein a simple, inexpensive, easily replaced straight thermometer indicates the operating temperature of the iron.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings, wherein;

Figure 1 is a view in perspective showing the tester of the present invention with an iron (in phantom) disposed thereon;

Figure 2 is a cross-section view through axis 2—2, Figure 1; and,

Figure 3 is a pictorial circuit diagram of the tester and showing the construction of the fuse.

Referring now to Figure 1, there is shown at 10 a horizontal platform upon which the iron I is placed for testing. This platform is a relatively thin sheet of asbestos hardboard or similar material capable of withstanding high temperature without damage and having relatively low thermal conductivity. Asbestos hardboard material for this purpose may consist of highly compressed asbestos fibers bonded together by a suitable binder capable of standing high temperature.

A sheet metal member 12 is bent in an L-shaped configuration to define a supporting frame for the platform 10. The back end of this frame, 12a, is bent over at 12c to receive the anchoring screws and nuts 14 and 14a, respectively, which hold the platform 10. The bottom 12b of the sheet 12 has a bent up marginal portion 12d which receives the front end of the sloping panel 16. This panel is of sheet metal and at its rear portion forms the horizontal surface 16a and the vertical wall 16b. The wall 16b terminates in the backwardly extending foot 16c which underlies a plurality of cut-outs 12e in the base portion 12b of the frame.

It will be observed that the panel 16 is in sloping relation relative to the platform 10 and at its upper edge 16d is below platform 10. The platform 10 is supported from the horizontal portion 16a of the panel 16 by the sleeves 18 which are secured in position by the lengthy screws 20 which threadedly receive the nuts 20a.

The surface temperature of the iron under test is indicated by the thermometer 22. This thermometer is held in position by the scale plate 24 which is marked with temperature gradations 24a and has complementary end portions 24b which define, in conjunction with the central portion of the plate, a passage capable of snugly receiving the thermometer 22. The plate 24 is affixed to the panel 16 by screws or similar anchoring devices.

The temperature sensitive bulb 22a of the thermometer 22 is received in the button indicated generally at 26. This button includes a relatively large cylindrical core portion 26a which is drilled out at 26b to receive the thermometer 22 as shown. The button 26 also has a thin marginal portion 26c extending in a relatively large circular area about the core 26a. The core 26a of the button 26 is received in a conforming hole 10a in the platform 10.

The button 26 is of material, such as aluminum, having good thermal conductivity so that the bulb 22a partakes of the surface temperature of the iron even though the iron rests only on a small part of the marginal portion 26c. Since the marginal portion 26c is relatively thin and the core portion 26a is relatively small in weight (taking into account the socket 26b which receives thermometer 22), the thermal capacity of the button is small and it creates no significant time delay between temperature changes on the surface of the iron and the temperature indicated by the thermometer 22.

Figure 3 shows the electrical energizing circuit for the iron under test. This circuit terminates in a bayonet plug 28 suitable for connection to the usual female socket. Starting with spade 28a of this plug, the circuit may be traced through socket 30 (to which the iron I is plugged in as shown in Figure 1), fuse socket 32, indicator light 42, and back to the complementary spade 28b. A resistance 44 bypasses most of the current flow about lamp 42 to prevent burnout.

The fuse 34 in socket 32 acts to interrupt current flow if the iron is short circuited or if the temperature of the iron becomes excessive. The latter operation is particularly important since an iron may have an internal condition which causes excessive heating and further damage if not interrupted.

As shown in Figure 3, the fuse 34 in socket 32 consists of a lengthy fusible wire 34a defining a conducting path across the socket terminals. This wire carries the heating current of the iron as shown in the figure. This wire is coiled at 34b about a core which is drawn toward the window 34d by spring 34c. The end 34e of the wire 34a is anchored in the end button 35 by a conducting cement which, when heated above a predetermined temperature, releases the wire 34a which is drawn by spring 34c to a circuit interrupting position.

When a short circuit exists in the iron under test wire 34a melts in the looped portion adjacent window 34d. If the iron overheats, the socket 32 partakes of that heating for reasons described hereafter and the circuit is broken when the wire 34a is released to snap to a circuit interrupting position under the bias of spring 34c.

The member 36 causes the button 35 of the fuse 34 to partake of the temperature of the iron I. This member is of L-shaped configuration and is embedded in its upper end in the hole 10b of the platform 10. At its lower end member 36 extends into the socket 32. As shown in Figure 3, a pair of thin mica washers 38 are fitted against the end of the member 36 and opposite these washers the contact button 32a of the socket 32 is fitted. The mica washers 38 sandwiched between button 32a and member 36 electrically isolate member 36 from the current conducting parts and, in addition, provide a limited temperature differential between fuse 34 and the member 36.

It will be observed that the upper end of member 36 is embedded in the platform 10 and terminates in spaced relation with the upper face thereof. Thus when an iron is on the platform 10 as shown in partial view in Figure 2, there is an air gap of predetermined size interposed between the bottom face of the iron and the top of the platform. This air gap provides a predetermined temperature differential between the temperature of the iron and the temperature of member 36 and is chosen so that the fuse 34 releases only when the temperature of the iron exceeds a safe value.

Since the iron rests on the top face of platform 10, and the member 36 terminates a predetermined distance below that face, the air gap 40 is of accurately predetermined size and provides a fixed thermal resistance between the iron and the member 36.

The apparatus of the present invention has proven highly practical and useful in testing irons. The platform 10 defines a low heat capacity surface that simulates an ordinary ironing board. The button 26 is of low heat capacity so that the temperature indicated by thermometer 22 represents the temperature of the iron without time delay. The fuse 34 effectively interrupts the energizing circuit to the iron in the event it is short circuited or the iron heats to a dangerous temperature.

Moreover, the apparatus of the present invention is cheap and easy to manufacture, since only stamped parts are required. Most important, however, the thermometer 22 is a straight thermometer (since the button 26 lies in the plane of panel 24) and no special bends are required. This feature alone greatly decreases the cost of the unit over those heretofore used.

While I have shown and described a specific embodiment of my invention, it will of course be understood that I do not wish to be limited thereto and that many modifications and alternative embodiments may be made without departing from the true spirit and scope thereof. I therefore intend by the appended claims to cover all modifications and alternative constructions falling within their true spirit and scope.

What I claim as new and desire to secure by Letters Patent of the United States:

1. A testing device for irons or the like, comprising a frame having openings therein providing outlets for the dissipation of heat, a platform mounted upon said frame and adapted to support an iron, a thermometer mounted upon said frame and having the temperature sensitive portion thereof in heat exchange relation with said platform, a thermal responsive fuse mounted upon said frame in spaced relation with said platform and being adapted to interrupt an electric circuit when the temperature of the fuse reaches a predetermined value, a heat transfer member extending between said fuse and platform and being in heat exchange relation therewith, and an electric circuit through said fuse for heating an iron, whereby the temperature of an iron being heated upon said platform is transferred through said heat exchange member and to said fuse and is also indicated by said thermometer, while heat transferred through said platform is dissipated through said openings with the result that said fuse interrupts said circuit only when the temperature of an iron being heated exceeds a predetermined value.

2. A testing device for irons or the like, comprising a frame having openings therein providing outlets for the dissipation of heat, a platform of relatively low thermal conductivity mounted upon said frame and adapted to support an iron, an expansible fluid thermometer mounted upon said frame and having the temperature sensitive portion thereof in heat exchange relation with the upper surface of said platform, a thermal responsive fuse mounted upon said frame in spaced relation with said platform and being adapted to interrupt an electric circuit when the temperature of the fuse reaches a predetermined value, a heat transfer member of relatively high thermal conductivity extending between said fuse and platform and being in heat exchange relation with said fuse and with the upper surface of said platform, and an electric circuit through said fuse for heating an iron, whereby the temperature of an iron being heated upon said platform is transferred through said heat exchange member and to said fuse and is also indicated by said thermometer, while heat transferred through said platform is dissipated through said openings with the result that said fuse interrupts said circuit only when the temperature of an iron being heated exceeds a predetermined value.

3. A testing device for electric irons or the like, comprising a frame having open ends providing outlets for the dissipation of heat, a platform mounted upon said frame and being adapted to support an iron and being formed of a material having relatively low heat conductivity properties, a mercury thermometer mounted upon said frame and having the temperature sensitive portion thereof in heat exchange relation with the upper surface of said platform, a thermal responsive fuse equipped with a shield and mounted upon said frame in spaced relation with said platform and being adapted to interrupt an electric circuit when the temperature of the fuse reaches a predetermined value, a heat transfer member of relatively high heat conductivity extending between said fuse and platform and being in heat exchange relation with said fuse and with the upper surface of said platform, and an electric circuit through said fuse for heating an iron, whereby the temperature of an iron being heated upon said platform is transferred through said heat exchange member and to said fuse and is also indicated by said thermometer, while heat transferred through said platform is dissipated through said openings with the result that said fuse interrupts said circuit only when the temperature of an iron being heated exceeds a predetermined value.

4. The structure of claim 3 in which a button having high thermal conductivity is embedded in said platform and receives the temperature sensitive portion of said thermometer.

5. The structure of claim 4 in which said platform is provided with an aperture and an end of said heat transfer member is embedded in said aperture.

FRANK M. MURPHY.

References Cited in the file of this patent

UNITED STATES PATENTS

| Number | Name | Date |
|---|---|---|
| 1,548,489 | Sears | Aug. 4, 1925 |
| 1,613,194 | Ratterman | Jan. 4, 1927 |
| 1,691,247 | Matthews | Nov. 13, 1928 |
| 2,447,580 | Kaumans | Aug. 24, 1948 |
| 2,541,121 | Sparklin | Feb. 13, 1951 |